United States Patent
Avetoom et al.

(10) Patent No.: US 11,394,702 B2
(45) Date of Patent: Jul. 19, 2022

(54) AUTHENTICATION SYSTEM WHEN AUTHENTICATION IS NOT FUNCTIONING

(71) Applicant: T-Mobile USA, Inc., Bellevue, WA (US)

(72) Inventors: Paul Avetoom, Bellevue, WA (US); Nandita Sharma, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 351 days.

(21) Appl. No.: 16/579,141

(22) Filed: Sep. 23, 2019

(65) Prior Publication Data

US 2021/0092104 A1 Mar. 25, 2021

(51) Int. Cl.
*H04L 9/40* (2022.01)
*H04W 40/34* (2009.01)
*H04W 12/06* (2021.01)
*H04W 84/04* (2009.01)

(52) U.S. Cl.
CPC .............. *H04L 63/08* (2013.01); *H04W 12/06* (2013.01); *H04W 40/34* (2013.01); *H04W 84/042* (2013.01)

(58) Field of Classification Search
CPC ........ H04L 63/08; H04L 69/40; H04W 12/06; H04W 40/34; H04W 84/042; H04W 36/0038
See application file for complete search history.

(56) References Cited

U.S. PATENT DOCUMENTS

| | | | | |
|---|---|---|---|---|
| 6,732,179 B1* | 5/2004 | Brown | ................ | H04L 12/1845 709/225 |
| 7,876,754 B2* | 1/2011 | Novaes | .................... | H04L 45/48 370/390 |
| 9,220,118 B1* | 12/2015 | Ramamurthy | ...... | H04L 63/0892 |
| 11,100,146 B1* | 8/2021 | Brest | ..................... | G06F 21/629 |
| 2002/0083317 A1* | 6/2002 | Ohta | ..................... | H04L 9/3236 713/161 |
| 2002/0161857 A1* | 10/2002 | Narasimhan | ............... | G06F 8/30 709/219 |
| 2003/0226037 A1* | 12/2003 | Mak | ........................ | H04L 12/66 726/10 |
| 2004/0064699 A1* | 4/2004 | Hooker | ................. | H04L 9/3271 713/170 |
| 2005/0246346 A1* | 11/2005 | Gerdes | .................. | H04L 63/029 |
| 2006/0036690 A1* | 2/2006 | O'Neil | ..................... | H04L 51/12 709/206 |
| 2006/0046689 A1* | 3/2006 | Kim | ..................... | H04W 12/126 455/406 |
| 2006/0061820 A1* | 3/2006 | Okamoto | ........... | H04N 1/32122 358/1.15 |
| 2007/0088793 A1* | 4/2007 | Landsman | .............. | H04L 51/12 709/207 |
| 2007/0130471 A1* | 6/2007 | Walker Pina | ........... | H04L 67/14 713/182 |
| 2007/0250612 A1* | 10/2007 | Elias | .................... | H04L 41/082 709/223 |

(Continued)

Primary Examiner — Aravind K Moorthy
(74) Attorney, Agent, or Firm — Loeb & Loeb LLP

(57) ABSTRACT

In response to determining that the authentication function operating on the authentication node on a network is not responsive, a re-direct message may be communicated to at least one edge device on the network that requests of the authentication function on the authentication node be re-directed to a different authentication node.

16 Claims, 7 Drawing Sheets

(56) References Cited

U.S. PATENT DOCUMENTS

| | | | | |
|---|---|---|---|---|
| 2007/0271618 A1* | 11/2007 | Chao | H04L 9/3263 | 726/27 |
| 2008/0080858 A1* | 4/2008 | Feldman | H04Q 11/0062 | 398/30 |
| 2008/0104580 A1* | 5/2008 | Wilkinson | G06F 8/433 | 717/141 |
| 2008/0126333 A1* | 5/2008 | Bezar | G06F 16/2282 | |
| 2008/0130869 A1* | 6/2008 | Akkar | G06F 21/52 | 380/28 |
| 2008/0155278 A1* | 6/2008 | Carrico | H04L 63/04 | 713/194 |
| 2008/0235426 A1* | 9/2008 | De | G06F 13/24 | 710/269 |
| 2008/0240440 A1* | 10/2008 | Rose | H04W 12/50 | 713/169 |
| 2009/0054082 A1* | 2/2009 | Kim | H04W 12/06 | 455/456.2 |
| 2009/0196170 A1* | 8/2009 | Ayyagari | H04L 45/30 | 370/221 |
| 2010/0009669 A1* | 1/2010 | Pirhonen | H04W 12/082 | 455/419 |
| 2011/0078328 A1* | 3/2011 | Dunsdon | H04L 45/02 | 709/238 |
| 2011/0314467 A1* | 12/2011 | Pearson | H04L 47/2475 | 718/1 |
| 2013/0067059 A1* | 3/2013 | Gatta | H04L 12/12 | 709/224 |
| 2013/0325926 A1* | 12/2013 | Oozeki | H04L 67/1097 | 709/203 |
| 2014/0064057 A1* | 3/2014 | Bryskin | H04L 47/74 | 370/217 |
| 2014/0075203 A1* | 3/2014 | Barbu | G06F 7/723 | 713/189 |
| 2014/0090041 A1* | 3/2014 | Kim | H04L 63/0815 | 726/7 |
| 2014/0173718 A1* | 6/2014 | Kodama | G06F 21/44 | 726/19 |
| 2014/0325220 A1* | 10/2014 | Tunnell | G06F 21/00 | 713/168 |
| 2015/0121013 A1* | 4/2015 | Chiang | G06F 12/126 | 711/133 |
| 2015/0161416 A1* | 6/2015 | Na | G06F 21/60 | 713/192 |
| 2016/0007293 A1* | 1/2016 | Hyland | H04W 24/08 | 455/40 |
| 2016/0029228 A1* | 1/2016 | Mufti | H04W 24/04 | 370/225 |
| 2016/0042767 A1* | 2/2016 | Araya | H04N 7/188 | 386/201 |
| 2016/0188459 A1* | 6/2016 | Kanno | G06F 12/02 | 711/103 |
| 2016/0277436 A1* | 9/2016 | Lim | H04L 63/0236 | |
| 2017/0063932 A1* | 3/2017 | Hubbard | H04L 63/0861 | |
| 2017/0109770 A1* | 4/2017 | Kusens | G06Q 30/0207 | |
| 2017/0150353 A1* | 5/2017 | Hillis | H04L 63/1483 | |
| 2017/0169227 A1* | 6/2017 | Rajcan | G06F 9/4416 | |
| 2017/0201546 A1* | 7/2017 | Park | H04L 63/20 | |
| 2017/0295489 A1* | 10/2017 | Agiwal | H04W 12/108 | |
| 2017/0337370 A1* | 11/2017 | Chereshnev | H04B 1/3833 | |
| 2017/0345456 A1* | 11/2017 | Hassner | G06F 11/1048 | |
| 2017/0372055 A1* | 12/2017 | Robinson | H04L 63/0853 | |
| 2017/0374551 A1* | 12/2017 | Shen | H04L 29/06 | |
| 2018/0041488 A1* | 2/2018 | Kohli | H04L 63/20 | |
| 2018/0054432 A1* | 2/2018 | Bailey | H04W 12/068 | |
| 2018/0109541 A1* | 4/2018 | Gleichauf | H04W 12/06 | |
| 2018/0124697 A1* | 5/2018 | Nair | H04W 12/04 | |
| 2018/0191720 A1* | 7/2018 | Dawes | H04L 12/2825 | |
| 2018/0213461 A1* | 7/2018 | Grayson | H04L 45/123 | |
| 2018/0249339 A1* | 8/2018 | Noh | H04W 16/14 | |
| 2018/0341773 A1* | 11/2018 | Khatri | G06F 21/78 | |
| 2018/0375994 A1* | 12/2018 | Gestraud | H04L 63/205 | |
| 2018/0376444 A1* | 12/2018 | Kim | H04W 74/0833 | |
| 2019/0052616 A1* | 2/2019 | Campbell | H04L 67/145 | |
| 2019/0058991 A1* | 2/2019 | Al-Kabra | H04L 63/0421 | |
| 2019/0207950 A1* | 7/2019 | Mohammed | H04L 63/14 | |
| 2019/0215234 A1* | 7/2019 | Bonnin | G06F 21/64 | |
| 2019/0286806 A1* | 9/2019 | Robinson | H04W 12/64 | |
| 2019/0306780 A1* | 10/2019 | Baek | H04W 88/16 | |
| 2019/0380128 A1* | 12/2019 | Park | H04W 48/08 | |
| 2019/0394683 A1* | 12/2019 | Sillanpaa | H04W 60/04 | |
| 2020/0053083 A1* | 2/2020 | Kunz | H04L 63/0892 | |
| 2020/0067898 A1* | 2/2020 | Kosugi | H04L 63/08 | |
| 2020/0073698 A1* | 3/2020 | Wu | G06F 16/2379 | |
| 2020/0089867 A1* | 3/2020 | Kim | H04L 9/3231 | |
| 2020/0112572 A1* | 4/2020 | Ajayi | H04L 63/1416 | |
| 2020/0145414 A1* | 5/2020 | Romero | H04L 61/1511 | |
| 2020/0162919 A1* | 5/2020 | Velev | H04W 12/082 | |
| 2020/0193006 A1* | 6/2020 | Krieg | H04L 9/0866 | |
| 2020/0234003 A1* | 7/2020 | Bakman | H04W 4/50 | |
| 2020/0310823 A1* | 10/2020 | Poosapalli | G06F 9/4406 | |
| 2020/0404485 A1* | 12/2020 | Ranjan | H04L 63/08 | |
| 2021/0049309 A1* | 2/2021 | Su | G06F 21/83 | |
| 2021/0084492 A1* | 3/2021 | Budhathoki | H04L 9/0869 | |
| 2021/0135971 A1* | 5/2021 | Martin | H04L 67/26 | |
| 2021/0136658 A1* | 5/2021 | Rönneke | H04W 68/02 | |
| 2021/0194592 A1* | 6/2021 | Schaeffer | H04L 63/0861 | |
| 2021/0281577 A1* | 9/2021 | Sasaki | H04L 63/1441 | |

\* cited by examiner

AUTHENTICATION SYSTEM WHEN AUTHENTICATION IS NOT FUNCTIONING

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Users of mobile communication systems have to be authenticated into the systems to ensure only authorized users are permitted to use the systems. Authentication is a multiple step process using encryption algorithms and electronic keys to ensure the network is kept secure and only authorized users may use the system. However, the communication between users and the authorization system requires many hops through the network as the authorization system is usually deep within a network and the algorithms to encrypt the authorization data are purposely made to be difficult and take time to execute.

When a user attempts to authorize to a network and a response is not received such as when an authorization node is down, the user may repeat the authorization request. Further, there are often many, many users of a network and each user of the network may repeat their authorization requests. As a result, a significant amount of network traffic may be created as users repeatedly attempt to obtain authorization to the point that entire network may be brought down due to authorization traffic.

SUMMARY

The describes system and method may attempt to redirect network authorization traffic when a network authorization node has degraded performance or the authorization function is not operating. The method and system may determining whether an authentication function operating on an authentication node on a network is not responsive. In response to determining that the authentication function operating on the authentication node on a network is not responsive, a re-direct message may be communicated to at least one edge device on the network such that requests of the authentication function on the authentication node are re-directed to a different authentication node. Once the authentication function on the authentication node is operating again, a message may be communicated to the at least one edge device on the network to stop requiring redirection and allowing authentication requests to flow to the previously unresponsive node.

SPECIFICATION

The following section describes important high level concepts and components of Long Term Evolution (LTE) networks. Of course, the systems and method described herein may apply just as easily to other network types such as GSM, 4G, 5G and future network types. LTE is used as an example and should not be considered a limitation.

Figure 1:
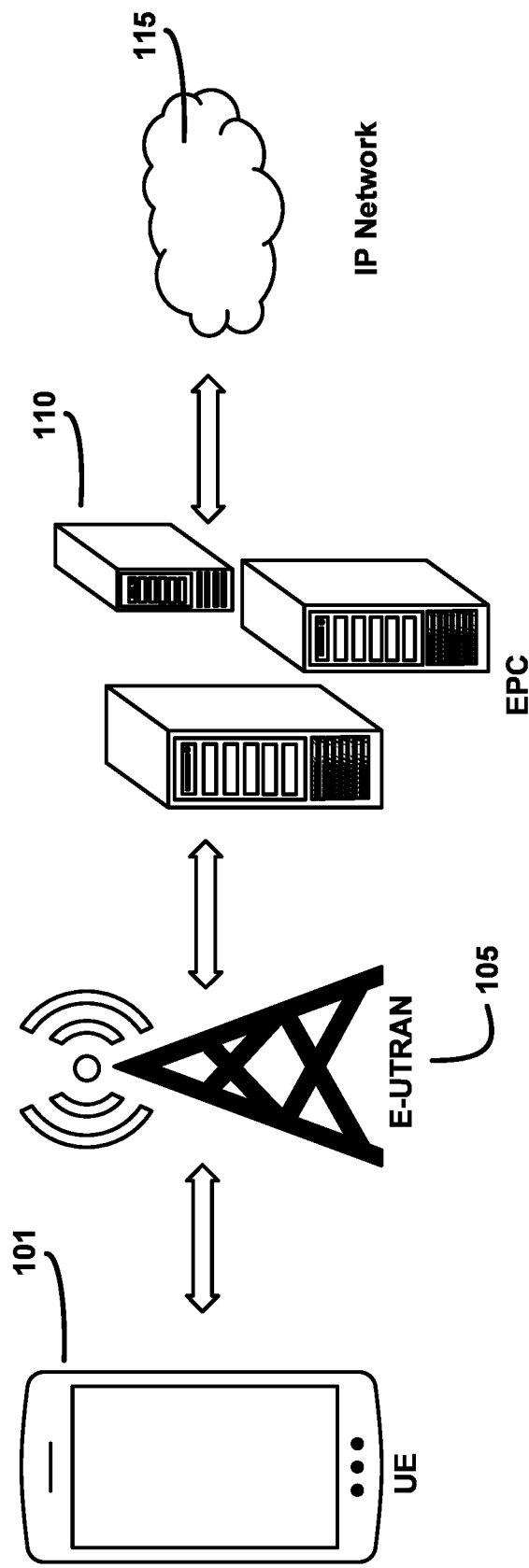
FIG. 1 may be a high level illustration of some elements of a LTE mobile network.
Figure 2:
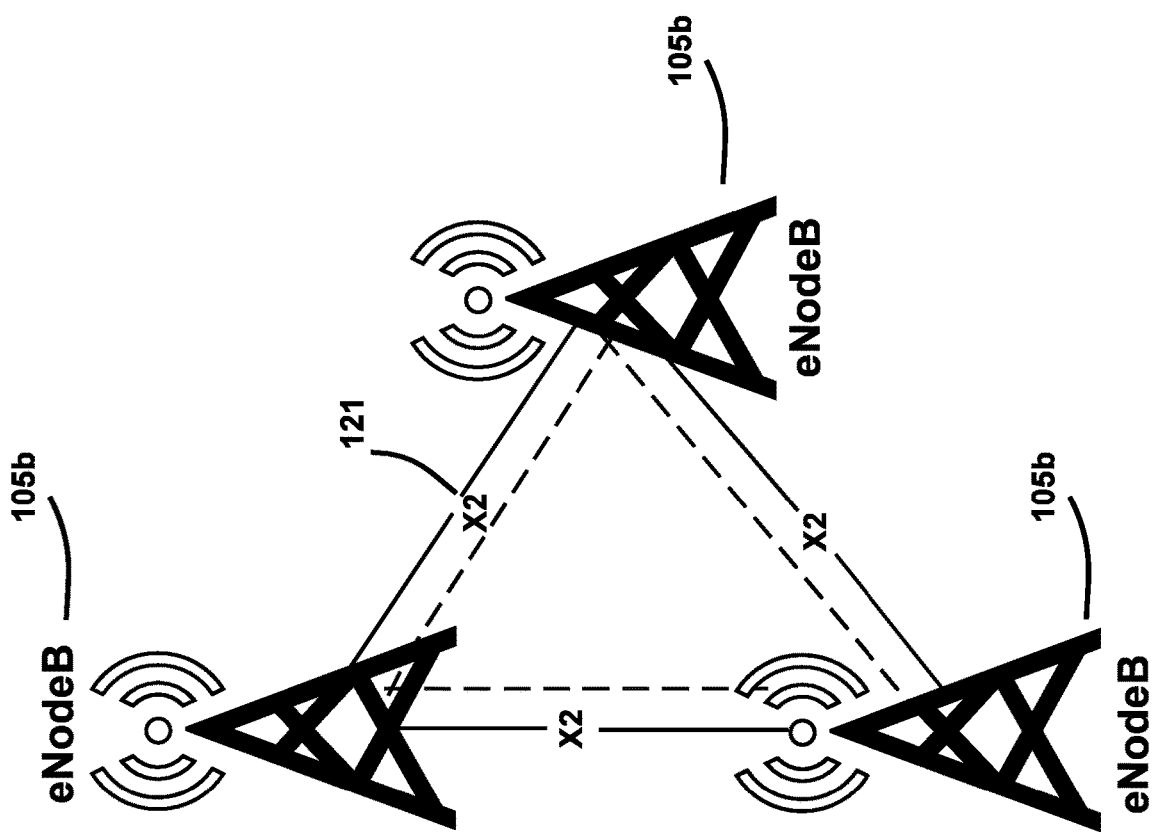
FIG. 2 may be an illustration of eNodeB communicating.

One of the fundamental concepts to the overall LTE network architecture may be that mobile devices (UEs) 101 connect to base stations that make up the Evolved Universal Terrestrial Radio Access Network (E-UTRAN) 105 via radio signals, and the base stations 110 may transmit and receive IP packets to and from the core network 115. The core network 115 may have a large number of entry and exit points, including the internet and connections to other cellular networks. FIG. 1 illustrates these high-level concepts.

In contrast to earlier cellular network technologies that use a hybrid of circuit-switched technology for voice and packet-switched technology for data, LTE may uses packet switched, IP-based technology. In the LTE architecture, voice traffic may traverse the network over the data connection using protocols, such as Voice over LTE (VoLTE), which is similar to Voice Over IP (VoIP). VoLTE may be deployed with widespread adoption by Mobile Network Operator MNO in the US. Mobile Network Operators (MNOs) still utilize legacy mobile devices Mobile devices 101 may be the primary endpoint in cellular networks, interacting with base stations 110 via radio signals to send and receive information. A mobile device 101 may be composed of two distinct systems: the general purpose mobile operating system (OS) (e.g., Android, iOS, Windows Phone) that users interact with and the telephony subsystem used to access the cellular network. The telephony subsystem may contain a distinct application processor referred to as the baseband processor, which has may have its own operating system used to interact with the cellular network, often developed by the cellular system on a chip (SoC) manufacturer.

LTE standards refer to a mobile device as the UE 101, which refers to both the terminal with the mobile operating system, baseband processor, and LTE radio, and the removable hardware token housing security-critical information used to obtain network access. This removable hardware token is colloquially referred to as the SIM card, but LTE standards may use the term Universal Integrated Circuit Card (UICC). The UICC, which is essentially a smartcard, may run a Java application known as the Universal Subscriber Identity Module (USIM). The USIM may interface with the cellular radio and subsequently the mobile network. The UICC may contain secret cryptographic keys that are shared with the MNO before it is provisioned to a user.

There may be two distinct identifiers used in cellular networks: The International Mobile Subscriber Identity (IMSI) 605 and the International Mobile Equipment Identifier (IMEI). The IMSI may be the long term identity that the carrier uses to identify a subscriber. The IMEI may be used to identify a specific mobile device to the network and is stored on a mobile device's internal flash memory, although the IMEI may also be stored on the UICC.

The following is a consolidated list of the components included within the UE 101:

User equipment (UE): Cellular device (cell phone, tablet, LTE modem, etc.) may include the following:
- Mobile Equipment (ME): The mobile terminal without the hardware token.
- UICC: A smart card that stores personal information, cryptographic keys, and is responsible for running java applications that enable network access. This smart card is inserted into the ME.
- International Mobile Equipment Identifier (IMEI): Terminal identity used to identify the mobile device to the cellular network.
- International Mobile Subscriber Identity (IMSI): User identity used to identify a subscriber to the cellular network.

In addition to the IMEI and IMSI, MNO's may utilize other LTE identities, including the Globally Unique Temporary Identity (GUTI) and the Temporary Mobile Subscriber Identity (TMSI). The GUTI may identify a UE 101 to a network without having to send the long-term identity (i.e., IMSI). Different identities may be used for various reasons, including limiting the exposure of a permanent identity, to minimize tracking of a device as it accesses multiple services on the network.

The Radio Access Network (RAN) has evolved over time into the Evolved Universal Terrestrial Radio Access Network (E-UTRAN) 105. UEs 101 may connect to the E-UTRAN 105 to send data to the core network. The E-UTRAN 105 may be a mesh network composed of base stations 105b. A base station 105b, or Evolved Node B, may modulate and demodulate radio signals to communicate with UEs 101. eNodeBs 105b may then act as a relay point to create and send IP packets to and from the core network. Cellular networks may be designed to pass connectivity from one radio access device in the E-UTRAN 105 to the next as the connected UE 101 changes location. This seamless handoff ability may allow devices to have a constant connection with minimal interruptions providing what is known as 'mobility' within cellular networks. eNodeBs 105b may use the X2 interface 121 to communicate with each other, primarily transmitting control signaling to allow for LTE network communication enabling UE mobility. During this handover, the serving eNodeB 105b may transfer all UE 101 context1, cellular parameters and other information about the UE 101, to the receiving eNodeB 105b.

LTE may use a concept of named interfaces to easily identify the communication link between two endpoints. A named interface in LTE terminology, such as the X2 interface 121, may refer to the logical link between two endpoints, and in this example two eNodeBs 105b. Named interfaces in LTE may be responsible for sending and receiving specified messages and data. These interfaces 121 may be physically implemented in a variety of ways and multiple named interfaces may share the same physical connection. This physical connection may be a variety of network technologies such as fiber, Ethernet, microwave, satellite link, etc.

Base stations 105 may come in a variety of form factors, different than a typical base station comprised of a physical cell tower and radio equipment. Small cells may have a smaller form factor, transmit at lower power levels, capable of extending network coverage, and ultimately increase the capacity of the network.

The following list consolidates this information:
- Evolved Universal Terrestrial Radio Access Network (E-UTRAN 105): All of the components providing wireless mobility.
- Evolved Node B 105b (eNodeB or eNB): An evolved Node B, colloquially referred to as a base station.
- Small Cell: Low powered base station with less range and less capacity than a typical eNodeB, for instance Home eNodeBs (HeNB), Donor eNodeBs (DeNB), and Relay Nodes (RN).

Evolved Packet Core

Figure 3:
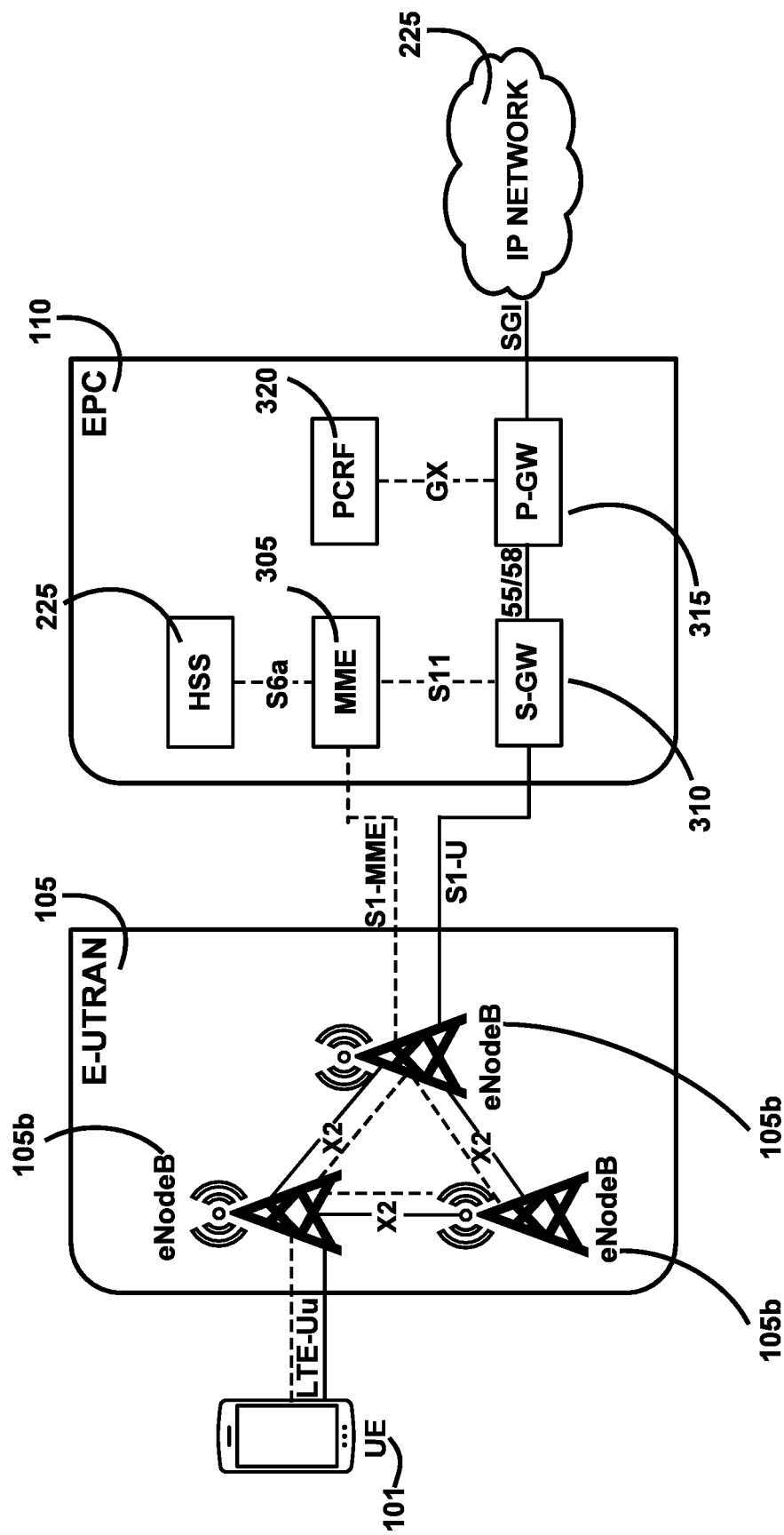
FIG. 3 may be a more detailed illustration of the hardware in a LTE mobile network.

The evolved packet core (EPC) 110, illustrated in FIG. 3, may be the routing and computing brain of the LTE network. UEs 101 may receive control signals through base stations originating from the Mobility Management Entity (MME) 305. The MME 305 may performs a large number of functions including managing and storing UE 101 contexts, creating temporary identifiers, paging, controlling authentication functions, and selecting the Serving Gateway (S-GW) 310 and Packet Data Network (PDN) Gateway (P-GW) 315, respectively. No user traffic may be sent through the MME 305. The S-GW 310 may anchor the UEs 101 for intra-eNodeB 105b handoffs and may route information between the P-GW 315 and the E-UTRAN 105. The P-GW 315 may be the default router for the UE 101, making transfers between 3GPP and non3GPP services, allocating IP addresses to UEs 101, and providing access to the PDN. The following list consolidates and defines the components included within the EPC 110:
- Evolved Packet Core (EPC) 110: Routing and computing brain of the LTE network.
- Mobility Management Entity (MME) 305: Primary network signaling node that does not interact with user traffic. Large variation in functionality including managing/storing UE 101 contexts, creating temporary IDs, sending pages, controlling authentication functions, and selecting the S-GW 310 and P-GWs 315.
- Serving Gateway (S-GW) 310: Carries user data, anchors UEs 101 for intra-eNodeB 105b handoffs, and routes information between the P-GW 315 and the E-UTRAN 105.
- Packet Data Network Gateway (P-GW) 315: Allocates IP addresses, routes packets, and interconnects with non-3GPP networks.
- Home Subscriber Server (HSS) 225: Master database with subscriber data and stores the secret key K.
- Authentication Center (AuC): Resides within the HSS 225, maps long term identities to pre-shared cryptographic keys, performs cryptographic calculations during authentication.
- Policy and Charging Rules Function (PCRF) 320: Rules and policies related to quality of service (QoS), charging, and access to network resources are distributed to the P-GW 315 and enforced by the PCRF 320.
- IP Multimedia Subsystem (IMS): Gateways to the public switched telephone network (PSTN), multimedia services (e.g., VoLTE, instant messaging, video), and paging for multimedia services.
- Backhaul: Connection between radio network and the core network. This connection can be fiber, satellite link, Ethernet cable, Microwave, etc.
- Packet Data Network (PDN) 225: Any external IP network (e.g., internet). UEs 101 can be connected to one or many PDNs at any point in time.
- Access Point Name (APN): Serves as the identifier for a PDN, and is the gateway between the EPC and PDN. The APN must be specified by the UE 101 for each PDN it connects to.

FIG. 3 depicts the components introduced above and shows the data flows between these network components. This graphic can serve as reference to visualize the interconnected fundamental LTE network components and may depict concepts not yet discussed. The solid lines in the diagram depict user traffic, while the dashed lines depict control signaling traffic.

LTE Network Topologies

An LTE network may minimally include a UE 101, a group of eNodeBs 105*b* and other radio access equipment making up the E-UTRAN 105 and the backend core network controlled by the MNO. The E-UTRAN 105 may be connected to the EPC 110 via a network link known as the backhaul. From a security perspective, the E-UTRAN 105 and EPC 100 are most likely in completely different geographic locations. Thus, the interfaces that link them may or may not be contained totally within the MNO's private domain.

A fixed LTE network may be a typical implementation of a cellular network utilizing multiple cell sites to provide coverage to a large geographic area. In this type of architecture, the core network components are generally in separate locations. The cell sites that house the eNodeBs 105*b* may connect to the EPC 110 through the backhaul. The backhaul connection may be provided by a multitude of technologies (e.g., microwave, satellite, fiber, etc.). An MNO may typically deploy this type of network architecture. Although LTE networks may require the same functional components in order to operate effectively, the quantity and placement of these components may completely dependent on the MNO's network design. It may be possible the network operator incorporates multiple EPC 110 components that serve critical functions as well as load balances these components to provide increased availability.

FIG. 3 may illustrate an example of a fixed LTE network for a large region being provided network coverage with the use of many spread out cell sites housing eNodeBs 105*b* all connecting back into one or multiple EPCs 110. Multiple eNodeBs 105*b* may be interconnected through the X2 interface, which may be responsible for session handover from one eNodeB 105*b* to the next as the UE 101 travels. Ultimately the components of the E-UTRAN 105 may be interconnected and communicate to the EPCs 110 through the backhaul or S1 interface. There may be many to many relationships between the E-UTRANs 105 and the EPCs 110 to provide high availability and reliability.

During authentication, in LTE network, the HSS 225 (Home Subscriber Server) is a database that contains Authentication Information and Subscriber's Data such as Services associated, Location Information etc. This interface is used to authenticate subscribers, providing services to subscribers, and to store location information of subscribers sent by MME 305.

Authentication may be a major function of HSS 225. A variety of message may be sent to the HSS for authentication purposes. One is an AIR/AIA (Authentication-Information-Request/Answer):—MME 305 fetches authentication data from HSS 225 to authenticate subscriber.

AIR/AIA may be an important and first message on S6a/S6d interface that has been exchange between MME 305 and the HSS 225 during very first attach procedure. MME 305 may ask for authentication credentials from the HSS 225 usually called as authentication vectors to authenticate and authorize the subscriber.

MME 305 may use EPS authentication vectors and MMS 305 may ask for authentication vectors. The MME 305 may tell the number of authentication vectors it needs, generally between 1-5. If this information is missing, then HSS 225 may send one authentication vector to the MME 305.

A sample structure used by MME to ask for EPS vectors may be as follows:

Requested-EUTRAN-Authentication-Info::=<AVP header:10415>
 [Number-Of-Requested-Vectors]
 [Immediate-Response-Preferred]
 [Re-synchronization-Info]

Generally a time-period on the MME 305 end for which if more than one vector are downloaded at MME 305 are treated as fresh. After that time is elapsed, the vectors may be treated as stale and may bel be deleted by MME 305 from its end. The MME 305 may send "Re-synchronization-Info" if sequence number mis-match at UE end and shall be discussed whole scenario in following article.

LTE Network Protocols

Figure 5:
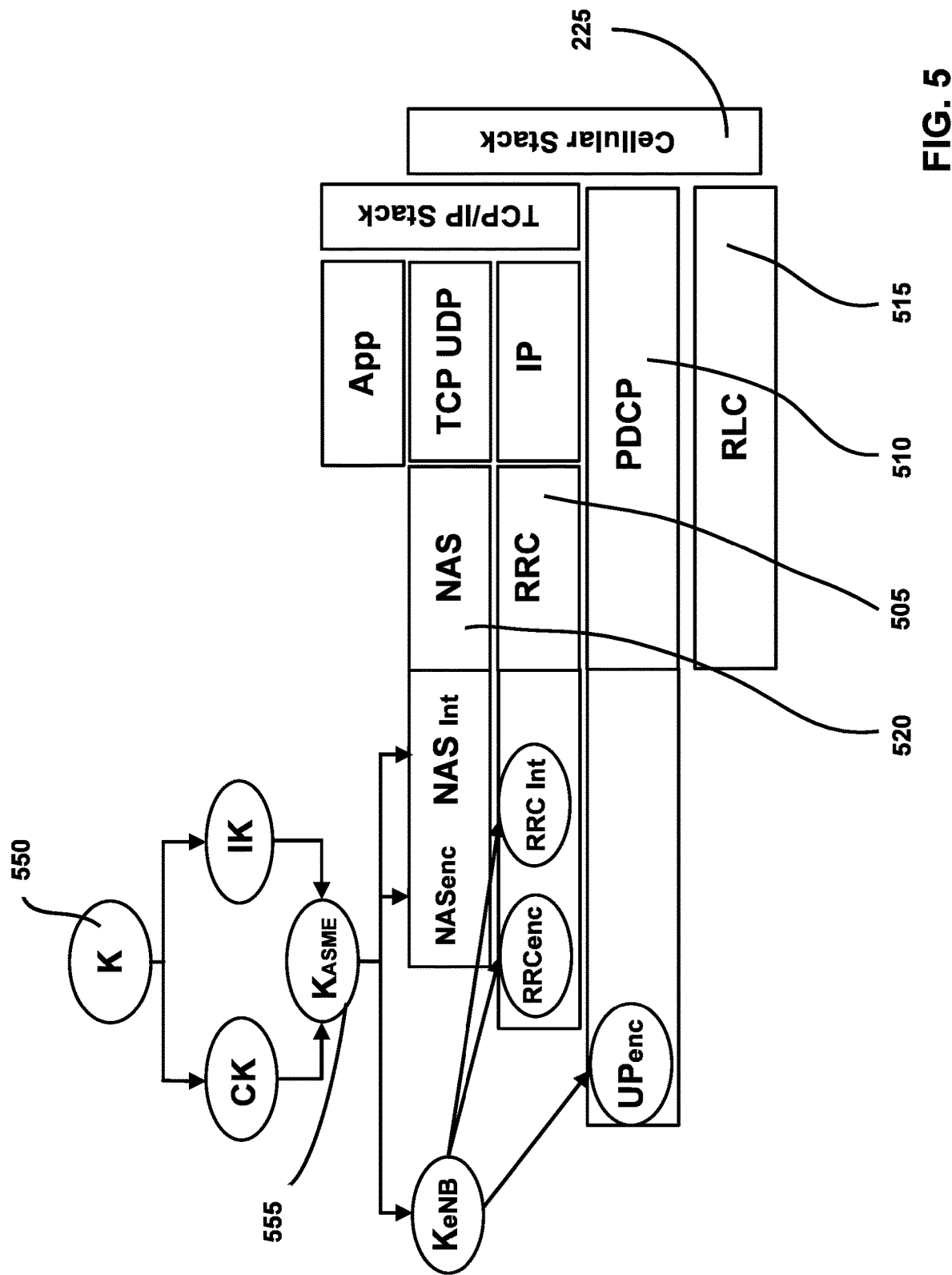
FIG. 5 may be an illustration of the computing layers used by a security module.

FIG. 5 may illustrate the network layers. The following protocols may be used for communication over the air interface (the radio link between the UE 101 and the eNodeB 105*b*). The protocol suite may be referred to as the air interface protocol stack, which is generally divided into three layers. Logically, these protocols may set the foundation for all TCP/IP traffic operating above it. These protocols may be:

Radio Resource Control (RRC) 505 operating at layer 3;
 Packet Data Convergence Protocol (PDCP) 510 operating at layer 2;
 Radio Link Control (RLC) 515 operating at layer 2;
 Medium Access Control (MAC) operating at layer 2; and
 Physical Access (PHY) operating at layer 1.

Each protocol within the air interface cellular stack may perform a series of functions and may operate on one of two logical planes: the user plane or the control plane. The user plane may be the logical plane responsible for carrying user data being sent over the network (e.g., voice communication, SMS, application traffic) while the control plane may be responsible for carrying all of the signaling communication needed for the UE 101 to be connected. To make the technology evolution paths somewhat independent, the 3GPP specifications partition the cellular protocols into two strata; the Non-Access Stratum (NAS) 520 and the Access Stratum (AS). The AS may be all communication between the UE 101 and eNodeB 105*b* occurring via the Radio Frequency (RF) channel. The NAS 520 may include all non-radio signaling traffic between UE 101 and MME. All of a user's TCP/IP and other application traffic may be transmitted via the user plane. The control plane, which may be required to setup, maintain, and terminate the air interface connection between the UE 101 and the MME 305, hosts the RRC 505 protocol. The PDCP 510, RLC 515, MAC, and PHY layers may form the foundation of the air interface and may be part of both user and control planes. The aforementioned control and user planes may operate on top of these protocols.

The RRC 505 may perform a variety of control tasks such as broadcasting system information, establishing a connection with the eNodeB 105*b*, paging, performing authentication, bearer establishment, and transferring Non-Access Stratum (NAS) messages. The PDCP 510 may perform header compression, packet reordering, retransmission, and access stratum security (including integrity and confidentiality protections). By standard, all cryptographic protection, both confidentiality and integrity, may be mandated to occur at the PDCP 510 layer. The RLC 515 may ready packets to be transferred over the air interface and transfers data to the MAC layer. It may also performs packet reordering and retransmission operations. The MAC may perform multiplexing, channel scheduling, Quality of Service (QoS) activities, and creates a logical mapping of data to the PHY layer. The PHY layer may provide error management, signal processing, and modulates data onto and off of the air interface.

The interfaces between the components within the E-UTRAN 105 and the EPC 110 may have their own communication protocols, not listed here.

LTE Bearers

In LTE networks, connections may be established between endpoints before user traffic can be communicated; these connections are called bearers. A bearer may be a connection between two endpoints that contains specific information about the traffic class, bit rate, delivery order, reliability, priority, and quality of service for its connection. A bearer may span multiple interfaces. It is important to note that there are two main types of bearers: signaling radio bearers and transport bearers. Signaling radio bearers may be established on the control plane in order to allow signaling communication between the UE 101 and eNodeB 105b, and the eNodeB 105b and MME 305. Transport bearers may be established along the path of the user plane in order to allow transmission of user data to its desired endpoint.

There are three signaling radio bearers that may need to be established which are solely used for the purpose of transmitting RRC 505 and NAS 520 messages:

Signaling Radio Bearer 0 (SRB0): SRB0 may be responsible for establishing the RRC 505 connection between the UE 101 and eNodeB 105b.

Signaling Radio Bearer 1 (SRB1): SRB1 may be responsible for the exchange of security information, measurement reports, fallback parameters, and handover information.

Signaling Radio Bearer 2 (SRB2): SRB2 may be responsible for the transferring of measurement information as well as NAS 520 messages. SRB2 may be configured after the establishment of SRB1 and security activation.

Once the SRBs are set up, the UE 101 may be connected to the core network through a specific eNodeB 105b, and may be ready to transmit and receive user data. Throughout the LTE network, there are multiple connection points (UE 101 to eNodeB 105b, eNodeB 105b to S-GW, etc.) that user traffic must traverse. In order for user traffic to be allowed to traverse the LTE network, multiple bearers must be established. For a UE 101 to have full network connectivity the following bearers may be established in this order:

Data Radio Bearer (DRB): Established between the UE 101 and eNodeB 105b on the air interface (also referred to as the Uu interface). It may allow direct user data communication between the UE 101 and eNodeB 105b.

S1 Bearer: Established between the eNodeB 105b and the appropriate S-GW on the S1-U interface.

E-UTRAN 105 Radio Access Bearer (E-RAB): This may be a combination of the DRB and S1 Bearer and may create a connection between the UE 101 and S-GW.

S5/S8 Bearer: Established between S-GW and the appropriate P-GW for the user data plane.

EPS Bearer: This may be a combination of the E-RAB and the S5/S8 Bearer and provides user plane connectivity from the UE 101 to the appropriate P-GW.

External Bearer: Mya be established between the P-GW and a resource external to the EPC that the UE 101 needs to access, such as connectivity to the internet.

End-to-End Service: This may be a combination of the EPS Bearer and the External Bearer and allows user plane access from a UE 101 to the appropriate resource that is external to the EPC.

Throughout the UE 101 attach process, bearers may be established on an as needed basis.

UE Attach

Before a UE 101 may join an LTE network and access voice and data services, it may go through a procedure to identify itself to the LTE network. This process is known as the Initial Attach Procedure and may handle the communication of identifiable information from the UE 101 to the LTE EPC to ensure that the UE 101 may access the network. If the process is successful, then the UE 101 may be provided default connectivity, with any charging rules that are applicable and enforced by the LTE network. The attach process may be illustrated in FIG. 6.

Figure 6:
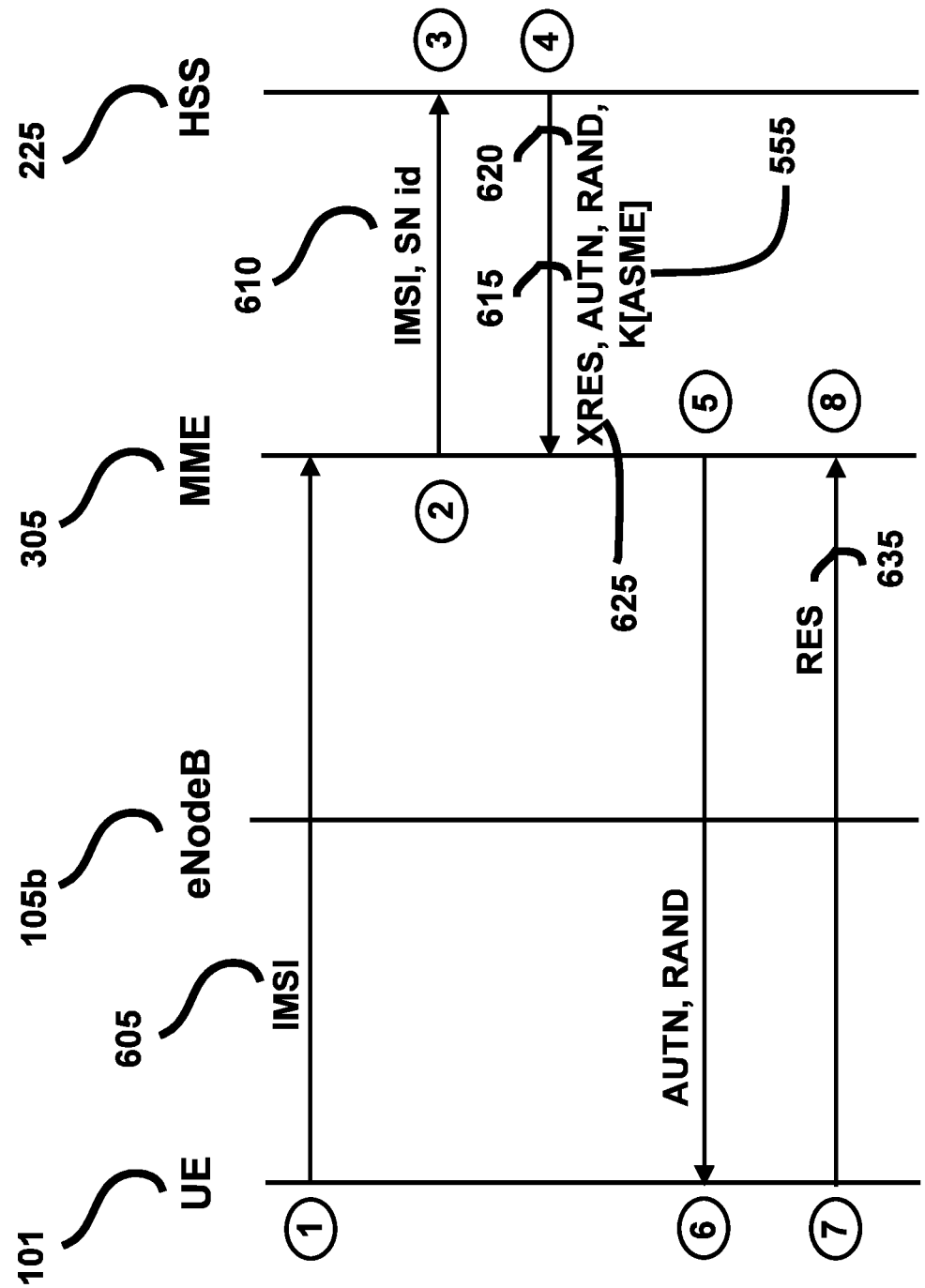
FIG. 6 may be an illustration of the steps for authentication of a user.

The Initial Attach procedure may begin as illustrated in FIG. 6 with an attach request from the UE 101 to the MME 305 via the eNodeB 105b. This request may include the IMSI 605, tracking information, cryptographic parameters, NAS sequencing number, and other information about the UE. The ATTACH REQUEST may be sent as a NAS message. The eNodeB 105b may then forward the ATTACH REQUEST along with information about the cell to which the UE 101 is connected on to the MME 305. For each PDN that the UE 101 connects to, a default EPS bearer may be established to enable the always-on IP connectivity for the users and the UE 101 during Network Attachment.

If there are specific Policy and Charging Control rules in the PCRF 320 for a subscriber or device for the default EPS bearer, they may be predefined in the P-GW 315 and turned on in the attachment by the P-GW 315 itself. During attachment, one or more Dedicated Bearer Establishment procedures may be launched to establish dedicated EPS bearer(s) for the specific UE 101. Also during the attach procedure, IP address allocation may be requested by the UE 101. The MME 305 may obtain the IMEI from the UE 101 and may check it with an EIR (Equipment Identity Register), which may verify that this UE's IMEI is not blacklisted. The MME 305 may then pass the IMEI software version to the HSS 225 and P-GW 315. Once a UE 101 has gone through the initial attach procedure, it may be assigned a GUTI by the MME 305. The GUTI may be stored in both the UE 101 and the MME 305 and may be used when possible instead of the IMSI 605 for future attach procedures for the specific UE.

Once the attach procedure is successfully completed, the UE 101 may authenticate via the Authentication and Key Agreement (AKA) protocol.

LTE Security

This section may describe in further detail the authentication, cryptographic protection mechanisms, hardware protection mechanisms, and network protections LTE provides. A high level discussion of LTE security goals may be provided within and an understanding of 3GPP's rationale for making certain security decisions and assumptions is recorded within.

Hardware Security

The UICC may be the next-generation Subscriber Identity Module (SIM) card used in modern mobile devices and is the foundation of the LTE security architecture. The UICC may host the Universal Subscriber Identity Module (USIM) application that performs the full range of security critical operations required of LTE cellular networks, such as authentication and other cryptographic functions. The UICC is a tamper resistant removable storage device that users can leverage to move their cellular service from one cellular device to another, while also providing the capability of storing contacts and other user data. The UICC may house a processor, ROM, RAM, may be network aware, and may be capable of running small Java applications used for a variety of functions ranging from maintenance, updates, and even video games. The UICC may also potentially be used for identity services and Near Field Communication (NFC).

From a security perspective, one of the most important functions of the UICC may be cryptographic key and credential storage. In LTE, UICCs may be provisioned with a long-term, pre-shared cryptographic key referred to as K 550. This key may be stored within the tamper resistant UICC and also within the core network (in the HSS) and may not leave either of those locations. All other keys in LTE's cryptographic structure may be derived from K 550, with the session master key referred to as K{ASME} 555. Security functions such as cryptographic operations and subscriber authentication may be performed by the UICC in conjunction with the HSS and MME. The UICC may also play a role in storing LTE security contexts. Security contexts may contain cryptographic keys, UE 101 security capabilities, and other security parameters generated during an attach that may be reused during future system accesses. The UICC also may store the IMSI 605 and IMEI, which are both used to support the use of identities. Some modern mobile equipment operating systems may implement the USIM PIN specified by 3GPP TS 121.111. This may allow a PIN to be configured on a UICC. As UICCs may be removed from one mobile device and inserted into another to provide service, the UICC PIN may prevent someone from stealing another user's UICC and obtaining unauthorized network access.

UE Authentication

The primary LTE authentication mechanism mobile handsets may use to authenticate to an LTE network is known as the Authentication and Key Agreement (AKA) protocol. The AKA protocol cryptographically may prove that the UICC and MNO have knowledge of the secret key K 550. From a security perspective, this effectively may authenticate the UICC to the network, but not the user or mobile device. An AKA protocol run may be depicted and further described below:

The AKA procedure illustrated in FIG. 6 may occur as part of the UE 101 attach process, and may provide mutual authentication between the UICC and the LTE network. AKA may be begun by a UE 101 providing its identifier to the appropriate MME 305 (item 1 in FIG. 6). This identifier may be permanent, as is the case with the IMSI 605, or may be temporary. Examples of temporary identifiers include the Temporary Mobile Subscriber Identity (TMSI) and Globally Unique Temporary UE 101 Identity (GUTI).

After the identifier is provided to the core network, the MME 305 may provide the identifier, alongside additional cryptographic parameters and the serving network ID (SN id) 610, to the HSS/AuC (item 2 in FIG. 6) these values then may be used to generate an authentication vector (AUTN) 615. To compute an AUTN 615, the HSS/AuC 225 may need to use a random nonce (RAND) 620, the secret key K 550, and a Sequence Number (SQN) as inputs to a cryptographic function. This function may produce two cryptographic parameters used in the derivation of future cryptographic keys, alongside the expected result (XRES) 625 and authentication token (AUTN) (item 3 in FIG. 6) 615. This authentication vector 615 may be passed back to the MME 305 for storage (item 4 in FIG. 6). In addition, the MME 305 may provide the AUTN 615 and RAND 620 to the UE 101, which may then be passed to the USIM application (item 5 in FIG. 6) in the UE 101. The USIM in the UE 101 may send AUTN 615, RAND 620, the secret key K 550, and its SQN through the same cryptographic function used by the HSS/AuC (item 6 in FIG. 6). The result may be labeled as RES 635, which is sent back to the MME (item 7 in FIG. 6) 305. If the XRES value is equal to the RES 635 value, authentication may be successful and the UE 101 is granted access to the network (item 8 in FIG. 6).

As can be seen, the authentication process involves many parts of the network and has to access many hops into the depth of the network as illustrated in FIG. 6. Thus, when there are issues with authentication, an authentication request has to travel through the system only for the request to be denied. In some instances, the authentication request may be repeated as a positive authorization signal may not be received and the request may be repeated. In other instances, a denial or timeout indication may be communicated from the authorization system which may cause additional authorization request. In each case, a significant amount of network traffic is generated when an authorization system is unable to respond. As a result, traffic on the network slows down as authorization requests continue to flood the network with a network shutdown being a realistic possibility.

Figure 7:
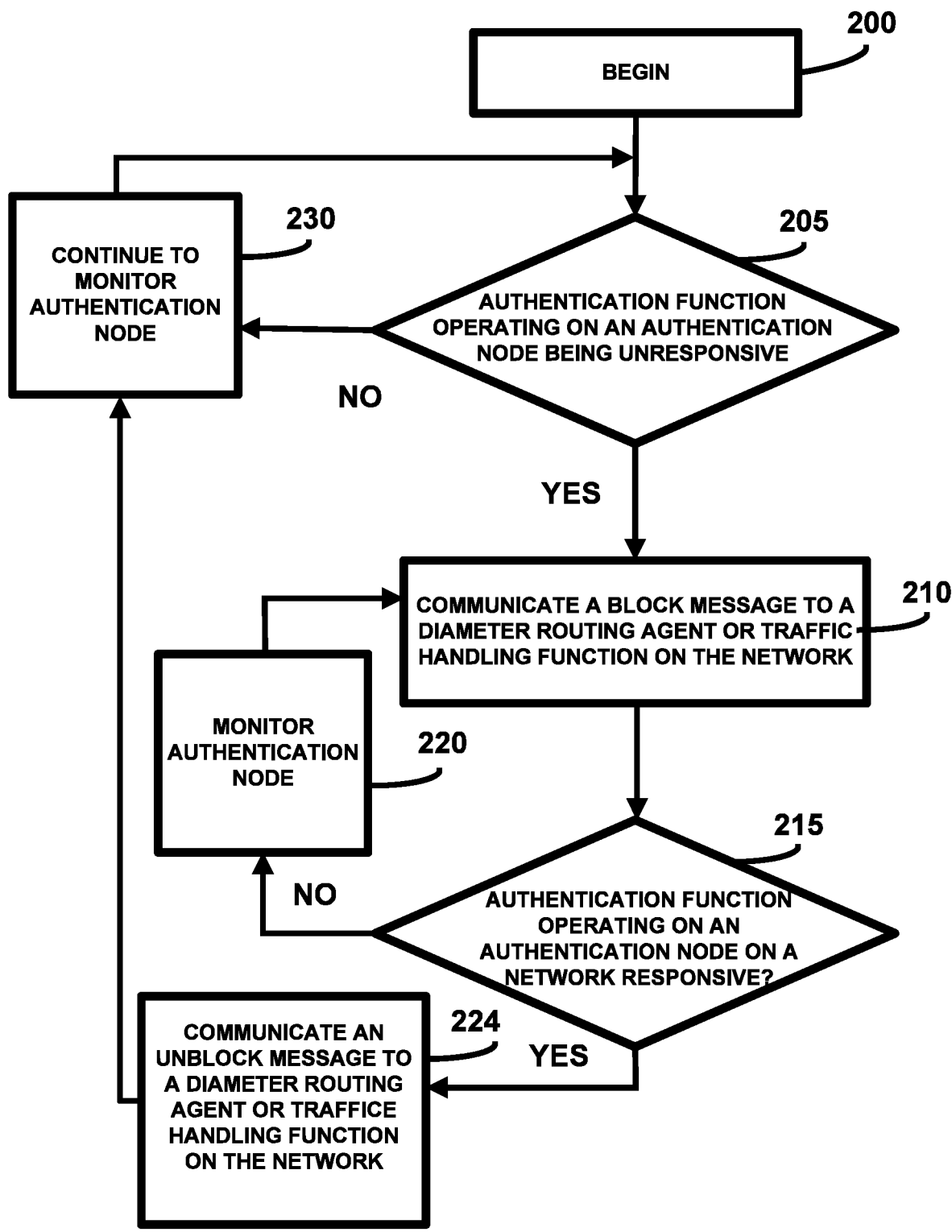
FIG. 7 may be an illustration of computing blocks executed by the system.

In response, the proposed system and method address the unresponsive authorization node problem. FIG. 7 may be one approach. At block 200, the method may begin. At block 205, it may be determined whether an authentication function operating on an authentication node on a network is being unresponsive. The determination may be made in a variety of ways.

In one embodiment, an authority on the network may track network traffic. The authority may determine that authorization requests are being made repeatedly which may indicate that the authentication node is not being responsive.

In another embodiment, an authority on the network may track network traffic and may notice that authentications have stopped flowing from an authentication node. In some embodiments, the number of authentication requests may be matched to the number of authentication responses and if the difference is under a threshold, the system may assume that the authentication node is down.

In another embodiment, the authentication node may return an error or message that indicates that the authentication node is not responding at the current time. The error code may be a time out notification. In other embodiments, the error code may be a pre-set code that the authorization node communicates when the authorization function is not operating or is operating at a reduce efficiency.

If the determination at block 205 if that the authentication function operating on the authentication node is not being unresponsive, control may pass to block 230 where the authentication node may continue to be monitored.

At block 210, in response to determining that the authentication function operating on the authentication node on a network is unresponsive, the method may attempt to direct traffic to other authentication nodes. By re-directing traffic, the network may not be clogged to the point of breaking down with repeated authorization requests.

Figure 4:
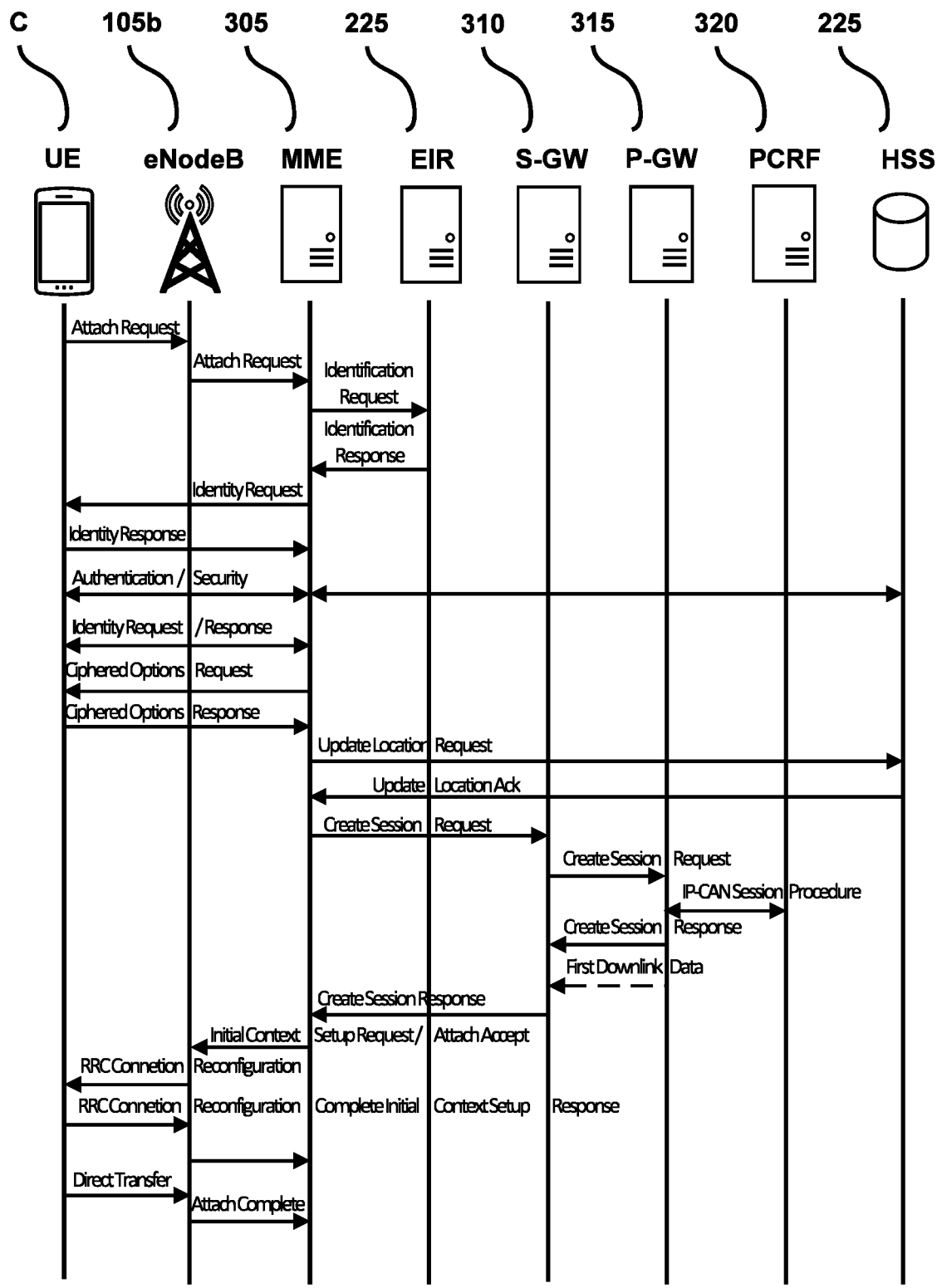
FIG. 4 may be a flow illustration of the steps of a mobile communication device beginning communication with a mobile network.

In one embodiment, a re-direct message may be communicated to at least one edge device on the network that requests of the authentication function on the authentication node be re-directed to a different authentication node. At a high level, by moving the re-direct message to one or more edge device, authorization messages will not travel all the way to the authentication node inside the HSS as illustrated in FIGS. 4 and 6 before determining that the authentication node is not operating. Instead, the authorization messages will stay at the edge of the network and not clog the inner network.

In other embodiments, the error message may include the address of the additional authorization node that is capable of handling the authorization traffic. In some embodiments, the additional authorization node may be preset. In other embodiments, the additional authorization node may be determined by an authority that determines the additional authorization node that has been determined to be most efficient at handling the additional authorization traffic. In some embodiments, the additional authorization node may not be the closest node.

In another embodiment, there may be a plurality of additional authorization nodes. The authorization node may use intelligence from an authority to direct authorization traffic to the appropriate authorization node. The intelligence may be based on a random assignment or may be based on feedback from the network which may assist in assigning the traffic to the node determined to provide the best response.

Depending on the system design, an end-re-direct message may be communicated to a diameter routing agent or traffic handling function on the network.

At block 215, the method may determine that the authentication function operating on an authentication node on a network is responsive again. In some embodiments, the method may periodically test the authentication function on the node that was non-responsive. For example and not limitation, other authorization nodes may communicate a message to test the non-responsive authentication node.

In another embodiment, a network authority may test the node that was non responsive. For example, the network may have a troubleshooting system to track, identify and troubleshoot problems. The troubleshooting system may identify the problem and may periodically test the non-responsive node, such as communicating a test message every five minutes until the problem is corrected.

In some embodiments, the troubleshooting system may communicate a reset message to the non-responsive node in the hopes that a reset may fix the non-responsive authentication node. In other embodiments, the troubleshooting system may attempt to remotely determine the problem such as running through a root cause analysis and may communicate proposed fixes to the non-responsive authentication node. Assuming the reset or the fix works, the authentication node may become responsive and once the authentication node is responsive, the network, including the edge devices, may be notified that the non-responsive authentication node is now responsive.

In yet another embodiment, the non-responsive authentication node may require a hardware fix which may occur automatically such as switching to a backup server or may require the assistance of a human. Once the hardware fix is complete, the fixed hardware may communicate to the network that the authentication node is operational again.

In yet other embodiments, the non-responsive node may communicate a message when it is responsive again.

If the determination at block 215 is that the authentication function operating on the unresponsive authentication node continues to be unresponsive, control may pass to block 220, where the system may continue to test and monitor the unresponsive authentication node to see if it has been fixed.

If the determination at block 215 is that the authentication function operating on the unresponsive authentication node is no longer unresponsive, control may pass to block 224 where the network may announce that the unresponsive network node is no longer unresponsive and that the unresponsive network node should be used as normal and control may pass to block 230 where the various authentication nodes may continue to be monitored for desired performance.

In some embodiments, the system may determining if a previous authorization exists. For example, the authentication node in the HSS may keep previous authentications in a memory. In some embodiments, the previous authorizations may be marked as stale after a period of time. In other embodiments, the authorizations may be marked as unusable after a period of time. In yet another embodiments, the authorizations may be kept in a memory until a new authorization occurs for the user and the old authorization may be deleted or marked as stale.

In response to determining a previous authorization exists, the previous authorization may be used. Logically, if the authorization is days old, it may not be appropriate to be used. Thus, if the age of the previous authorization is above a threshold, the authorization request may be added to an authorization queue and the authorization request may have to wait for the authorization function to be operating again such that the authorization queue may be submitted to the authorization function.

The threshold may be determined in a variety of ways. In some embodiments, the threshold may be based on time. In other embodiments, the threshold may be based on the number of authorizations that have occurred since the original authorization. In yet another embodiment, the number of authorizations may have a limit and if the specific authorization is beyond the limit, it may not be used as being stale.

In other embodiments, the threshold may be a calculation based on the number of authorization requests that have not been answered during a period of time and if the number of unanswered authorizations is above a threshold, the threshold me be increased. For example, if a large number of authorization requests have not been answered, the threshold may be increased to keep the backlog of authorization request and re-requests from becoming excessive and clogging the network.

In yet another embodiment, the system and method may refrain from purging past authentication determinations in a memory within a purge time threshold. For example, if an authority on the system recognizes that authorization messages are not being communicated, the system may refrain from purging past authentication determinations in a memory within a purge time threshold. Of course, if the authentication determinations are over a threshold, the memory will still be purged as authentications which are too stale likely are not trustworthy and should be deleted. Similarly, once the authentication function is operating again, past authentication determination in the memory may be purged in response to an authentication being received again.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of redirecting authentication network traffic comprising:
   determining whether an authentication function operating on an authentication node on a network is unresponsive;
   in response to determining that the authentication function operating on the authentication node on a network is unresponsive,
      communicating a block message to a diameter routing agent or traffic handling function on the network that requests of the authentication function on the authentication node be blocked;
   determining that the authentication function operating on an authentication node on a network is responsive:
      in response to determining that the authentication function operating on the authentication node on a network is responsive,
         communicating an unblock message to a diameter routing agent or traffic handling function on the network that requests of the authentication function on the authentication node be unblocked;
   determining if a previous authorization exists;
      in response to determining a previous authorization exists, using the previous authorization;
   determining if the age of the previous authorization is above a threshold;
      in response to the age of previous authorization being above the threshold,
         adding the authorization request to an authorization queue;
         waiting for the authorization function to be operating; and
         submitting the authorization queue to the authorization function.

2. The method of claim 1, wherein the block message is an error code.

3. The method of claim 1, wherein the block message contains an address of a different authentication node if one is available.

4. The method of claim 1, wherein the block message cascades across an entire network.

5. The method of claim 1, wherein the unblock message cascades across an entire network.

6. The method of claim 1, wherein determining that the authentication function operating on an authentication node on a network is responsive comprises periodically testing the authentication function.

7. The method of claim 1, wherein determining that the authentication function operating on an authentication node on a network is responsive comprises receiving a message from the authentication function that it is responsive.

8. The method of claim 1, further comprising:
   refraining from purging past authentication determinations in a memory within a purge time threshold.

9. The method of claim 1, further comprising purging past authentication determination in the memory in response to an authentication being received again.

10. A computer system for authentication comprising a processor, a memory and input/output circuit, the processor being physically configured according to computer executable instructions for:
    determining whether an authentication function operating on an authentication node on a network is unresponsive;
    in response to determining that the authentication function operating on the authentication node on a network is unresponsive,
       communicating a block message to a diameter routing agent or traffic handling function on the network that requests of the authentication function on the authentication node be blocked;
    determining that the authentication function operating on an authentication node on a network is responsive:
       in response to determining that the authentication function operating on the authentication node on a network is responsive,
          communicating an unblock message to a diameter routing agent or traffic handling function on the network that requests of the authentication function on the authentication node be unblocked;
    determining if a previous authorization exists;
       in response to determining a previous authorization exists, using the previous authorization;
    determining if the age of the previous authorization is above a threshold;
       in response to the age of previous authorization being above the threshold,
          adding the authorization request to an authorization queue;
          waiting for the authorization function to be operating; and
          submitting the authorization queue to the authorization function.

11. The computer system of claim 10, wherein the block message is an error code.

12. The computer system of claim 10, wherein the block message contains an address of a different authentication node if one is available.

13. The computer system of claim 10, wherein the block message cascades across an entire network and wherein the unblock message cascades across an entire network.

14. The computer system of claim 10, wherein determining that the authentication function operating on an authentication node on a network is responsive comprises periodically testing the authentication function.

15. The computer system of claim 10, wherein determining that the authentication function operating on an authentication node on a network is responsive comprises receiving a message from the authentication function that it is responsive.

16. The computer system of claim 10, further comprising:
    refraining from purging past authentication determinations in a memory within a purge time threshold.

* * * * *